United States Patent
DeBates et al.

(10) Patent No.: US 10,234,688 B2
(45) Date of Patent: Mar. 19, 2019

(54) MOBILE ELECTRONIC DEVICE COMPATIBLE IMMERSIVE HEADWEAR FOR PROVIDING BOTH AUGMENTED REALITY AND VIRTUAL REALITY EXPERIENCES

(71) Applicant: Motorola Mobility LLC, Chicago, IL (US)

(72) Inventors: Scott DeBates, Crystal Lake, IL (US); Grant Lloyd, Lawrenceville, GA (US)

(73) Assignee: Motorola Mobility LLC, Chicago, IL (US)

( * ) Notice: Subject to any disclaimer, the term of this patent is extended or adjusted under 35 U.S.C. 154(b) by 45 days.

(21) Appl. No.: 15/334,161

(22) Filed: Oct. 25, 2016

(65) Prior Publication Data

US 2018/0113317 A1 Apr. 26, 2018

(51) Int. Cl.
*G06T 19/00* (2011.01)
*G02B 27/01* (2006.01)

(52) U.S. Cl.
CPC ..... *G02B 27/0176* (2013.01); *G02B 27/0172* (2013.01); *G06T 19/006* (2013.01); *G02B 2027/014* (2013.01); *G02B 2027/0138* (2013.01); *G02B 2027/0156* (2013.01); *G02B 2027/0163* (2013.01); *G02B 2027/0174* (2013.01)

(58) Field of Classification Search
None
See application file for complete search history.

(56) References Cited

U.S. PATENT DOCUMENTS

| | | | |
|---|---|---|---|
| 5,544,361 A | 8/1996 | Fine et al. | |
| 6,644,308 B2 | 11/2003 | Kalhok et al. | |
| 6,834,398 B1 | 12/2004 | Martinez | |
| 7,207,072 B2 | 4/2007 | Halsnes et al. | |
| 8,434,168 B2 | 5/2013 | Paulson | |
| 2003/0182716 A1 | 10/2003 | Wu | |
| 2006/0206995 A1* | 9/2006 | Hong | A42B 3/226 2/424 |
| 2014/0333773 A1* | 11/2014 | Davis | H04N 5/2252 348/158 |

(Continued)

OTHER PUBLICATIONS

"Trends and Vision of Head Mounted Display in Augmented Reality", by Kiyoshi Kiyokawa, 2012 International Symposium on Ubiquitous Virtual Reality, pp. 14-17. (Year: 2012).*

*Primary Examiner* — James A Thompson
(74) *Attorney, Agent, or Firm* — Philip H. Burrus, IV

(57) ABSTRACT

An apparatus can include headwear having a head receiver that is pivotally coupled to a first shield. A second shield can be attached to the headwear exterior to the first shield. The second shield can include a holographic optical element. An electronic device can be coupled to, or alternatively integrated with, the first shield. One or more processors of the electronic device can determined whether the first shield is in a first position relative to the head receiver or a second, angularly displaced position. Where the first shield is in the first position, the one or more processors can operate the electronic device in a virtual reality mode of operation. Where the first shield is in the second, angularly displaced position, the one or more processors can operate the electronic device in an augmented reality mode of operation.

20 Claims, 8 Drawing Sheets

(56) References Cited

U.S. PATENT DOCUMENTS

| | | | |
|---|---|---|---|
| 2015/0156716 A1* | 6/2015 | Raffle | G02B 27/017 455/418 |
| 2015/0234189 A1* | 8/2015 | Lyons | G02B 27/0172 345/174 |
| 2016/0116748 A1* | 4/2016 | Carollo | H04N 13/0285 345/8 |
| 2016/0178904 A1* | 6/2016 | Deleeuw | H04N 13/044 345/8 |
| 2016/0262608 A1 | 9/2016 | Krueger | |
| 2016/0274364 A1 | 9/2016 | Carollo et al. | |
| 2016/0292923 A1* | 10/2016 | Balachandreswaran | G02B 27/017 |
| 2016/0313790 A1* | 10/2016 | Clement | G06F 3/011 |
| 2017/0185037 A1* | 6/2017 | Lee | G03H 1/2205 |
| 2017/0299869 A1* | 10/2017 | Urey | G02B 27/0172 |

\* cited by examiner

MOBILE ELECTRONIC DEVICE COMPATIBLE IMMERSIVE HEADWEAR FOR PROVIDING BOTH AUGMENTED REALITY AND VIRTUAL REALITY EXPERIENCES

BACKGROUND

Technical Field

This disclosure relates generally to electronic devices, and more particularly to devices operable in multiple modes of operation.

Background Art

Immersive head mounted displays have been developed to provide alternative reality experiences to a user. These alternative reality experiences occur when electronically rendered images are delivered to a user's eyes in such a way that they are perceived as real objects. Conventional head mounted displays can provide, for example, a virtual reality experience to a user for gaming, simulation training, or other purposes. In virtual reality systems, images are presented to a user's eyes solely from an electronic device without the addition of light or images from the physical environment. Other conventional head mounted displays can provide a different experience, namely, an augmented reality experience to a user. In augmented reality systems, electronically generated images are presented to a user as an augmentation to light or images from the physical environment.

While such conventional head mounted displays can perform well for their given technologies, they do not support other technologies. Thus, a virtual reality head mounted display cannot provide a virtual reality experience and vice versa. It would be desirable to have an improved device capable of providing both augmented reality and virtual reality experiences to a user.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figures 1, 2:
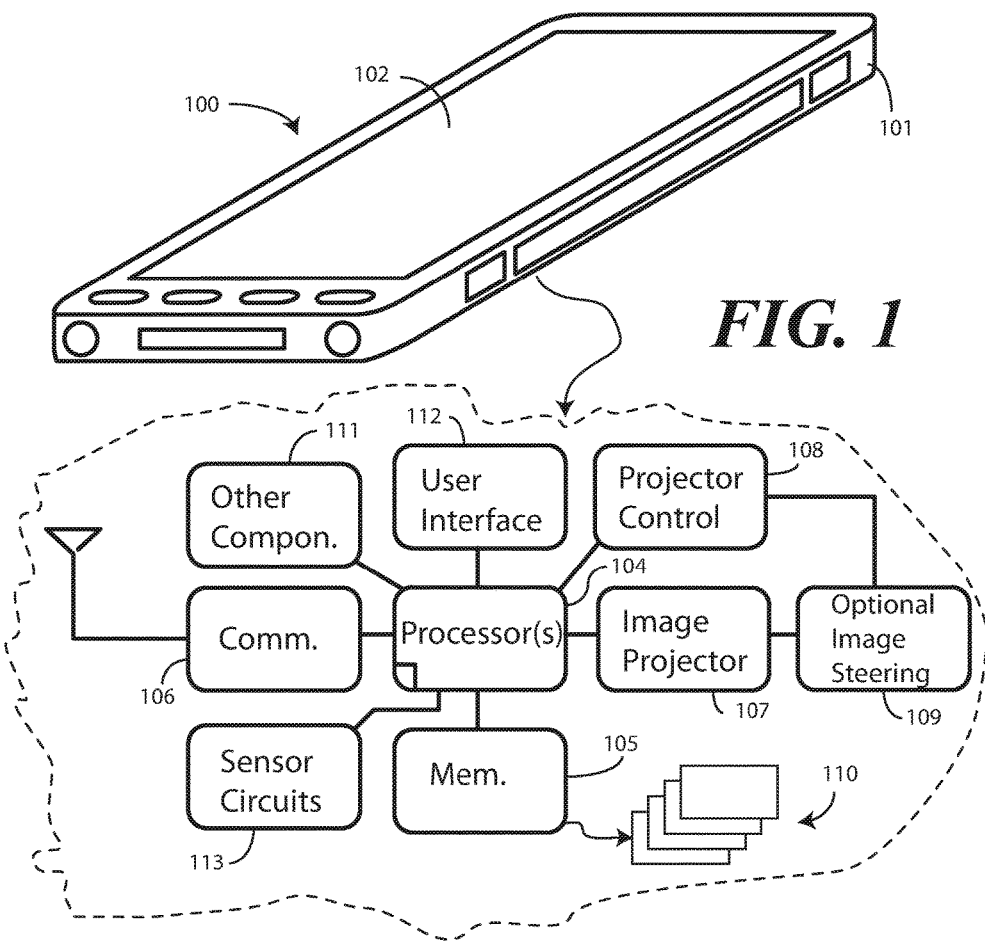
FIG. 1 illustrates one explanatory electronic device in accordance with one or more embodiments of the disclosure.
FIG. 2 illustrates one or more sensors operable, alone or in combination, with an electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to providing, with a single, portable electronic device, both augmented reality and virtual reality experiences to a user when the electronic device is coupled to a headwear in accordance with one or more embodiments of the disclosure. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of providing either virtual reality experiences or augmented reality experiences to a user when coupled to headwear configured in accordance with embodiments of the disclosure as described herein. The non-processor circuits may include, but are not limited to, a radio receiver, a radio transmitter, signal drivers, clock circuits, power source circuits, and user input devices. As such, these functions may be interpreted as steps of a method to perform the delivery of either augmented reality experiences or virtual reality experiences from a single device when coupled to headwear configured in accordance with embodiments of the disclosure. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide headwear configured to deliver either an augmented reality experience or a virtual reality experience to a user from a single device. In one embodiment, the headwear couples to couple to a portable electronic device, which serves as the single device providing the augmented reality or virtual reality experiences to the user. In other embodiments, the headwear includes its own integrated display, sensors, and processors to provide the augmented reality or virtual reality experiences to the user. In one or more embodiments, the headwear comprises a head receiver. A user inserts their head into the head receiver to mount the headwear on their head.

In one or more embodiments, the headwear comprises a first shield and a second shield. In one embodiment, the first shield is pivotally coupled to the head receiver while the second shield is stationary. In another embodiment, the first shield and the second shield are both pivotally coupled to the head receiver. In yet another embodiment, one or both of the first shield or the second shield are detachable from the head receiver and are capable of being attached to the head receiver at different geometric orientations relative to the head receiver. In one or more embodiments, the first shield is disposed interior to the second shield.

In one or more embodiments, the first shield is opaque. In one or more embodiments, the second shield is pellucid or translucent and includes a holographic optical element. In one or more embodiments, the first shield comprises a receiver into which the portable electronic device can be mounted. Accordingly, the electronic device can mechanically couple to the first shield when inserted into the receiver.

In one or more embodiments, the electronic device comprises one or more processors. The one or more processors can be operable with one or more sensors, which can include gravity detectors, proximity sensors, optical sensors, motion sensors, geolocational sensors, or other sensors. Working with the sensors, in one or more embodiments the one or more processors can determine whether the first shield is in a first position relative to the head receiver or, alternatively, whether the first shield is disposed in a second position relative to the head receiver that is angularly displaced from the first position.

In one or more embodiments, when the first shield is in the first position, the one or more processors operate the electronic device in a virtual reality mode of operation. For example, when the first shield is in the first position, the one or more processors may deliver images from the display to the user's eyes through one or more lenses to provide three-dimensional and other virtual reality effects to the user.

However, when the first shield is in the second, angularly displaced position, in one or more embodiments the one or more processors operate the electronic device in an augmented reality mode of operation. For example, in one embodiment the electronic device comprises a projector. The one or more processors can cause the projector to reflect images off of the holographic optical element to make augmented images appear before the user's eyes in the user's ordinary field of view.

In one or more embodiments, the first shield comprises one or more optical lenses. The optical lenses can be coupled to the first shield so as to pivot from a first orientation to a second orientation when the first shield pivots from the first position to the second, angularly displaced position. When the optical lenses pivot to the second orientation, they define an unobstructed optical line of sight between the electronic receiver and the holographic optical element so that images can be delivered to the holographic optical element without passing through the optical lenses. By contrast, when the firsts shield pivots or is otherwise moved to the first position, the optical lenses fall within the optical line of sight between the electronic receiver and the user's eyes. This allows images from the display to pass through the optical lenses to provide a virtual reality experience to the user.

Turning now to FIG. 1, illustrated therein is one explanatory electronic device 100 configured in accordance with one or more embodiments of the disclosure. The electronic device 100 of FIG. 1 is shown as a portable electronic device. As will be described in more detail below, in one or more embodiments the electronic device 100 is selectively attachable and detachable from headwear to provide either a virtual reality experience or an augmented reality experience to a user depending upon the physical configuration of the headgear. However, it should be noted that the electronic device 100 could be fully integrated into the headwear in other applications such that the headwear has integrated processors 104, display 102, and other components. For simplicity, the former embodiment will be described as an illustrative example. However, for each embodiment described, it should be noted that rather than attaching the electronic device 100 to a receiver of headwear, the components of the electronic device 100 could be integrated into the headwear instead.

The explanatory electronic device 100 of FIG. 1 includes a housing 101. The housing 101 can include one or more housing portions, such as a first housing portion and a second housing portion. In this illustrative embodiment, the first housing portion 103 is disposed about the periphery of the display 102.

A block diagram schematic of the electronic device 100 is also shown in FIG. 1. In one embodiment, the electronic device 100 includes one or more processors 104. The one or more processors 104 are operable with the display 102 and other components of the electronic device 100. The one or more processors 104 can include a microprocessor, a group of processing components, one or more ASICs, programmable logic, or other type of processing device. The one or more processors 104 can be operable with the various components of the electronic device 100. The one or more processors 104 can be configured to process and execute executable software code to perform the various functions of the electronic device 100.

A storage device, such as memory 105, can optionally store the executable software code used by the one or more processors 104 during operation. The memory 105 may include either or both static and dynamic memory components, may be used for storing both embedded code and user data. The software code can embody program instructions and methods to operate the various functions of the electronic device 100, and also to execute software or firmware applications and modules. The one or more processors 104 can execute this software or firmware, and/or interact with modules, to provide device functionality.

In this illustrative embodiment, the electronic device 100 also includes an optional communication circuit 106 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 106 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 106 can include wireless communication circuitry, one of a receiver, a transmitter, or transceiver, and one or more antennas.

In one or more embodiments, the electronic device 100 also includes a projector 107. In the illustrative embodiment of FIG. 1, the housing 101 supports the projector 107. As will be described in more detail below, where the projector 107 is included, in one or more embodiments the projector 107 is configured to deliver images to a holographic optical element when the electronic device 100 is operating in an augmented reality mode of operation.

In one embodiment, the projector 107 is a modulated light projector operable to project modulated light images along a surface or holographic optical element. In another embodiment, the projector 107 is a thin micro projector. In another embodiment, the projector 107 can comprise a laser projector display module. Other types of projectors will be obvious to those of ordinary skill in the art having the benefit of this disclosure.

In one or more embodiments, the projector 107 can include a lens and a spatial light modulator 109 configured to manipulate light to produce images. The projector 107 can include a light source, such as a single white light emitting diode, multiple separate color light emitting diodes, or multiple separate color laser diodes that deliver visible light to the spatial light modulator through a color combiner. A projector control manager 108 can be coupled to the spatial light modulator 109 to drive the spatial light modulator 109 to modulate the light to produce images. The spatial light modulator 109 can be optically coupled (e.g., by free space propagation) to the lens and/or a beam steerer. Where used, a beam steerer serves to steer a spatially modulated light beam emanating from the spatial light modulator 109 through the lens to create images.

The one or more processors 104 can be responsible for performing the primary functions of the electronic device 100. For example, in one embodiment the one or more processors 104 comprise one or more circuits operable with one or more user interface devices, which can include the display 102, to present presentation information to a user. The executable software code used by the one or more processors 104 can be configured as one or more modules 110 that are operable with the one or more processors 104. Such modules 110 can store instructions, control algorithms, and so forth. While these modules 110 are shown as software stored in the memory 105, they can be hardware components or firmware components integrated into the one or more processors 104 as well.

Other components 111 can be included with the electronic device 100. The other components 111 can be operable with the one or more processors 104 and can include input and output components associated with a user interface 112, such as power inputs and outputs, audio inputs and outputs, and/or mechanical inputs and outputs. The other components 111 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms. Still other components will be obvious to those of ordinary skill in the art having the benefit of this disclosure.

One or more sensor circuits 113 are operable with the one or more processors 104 in one or more embodiments. These sensor circuits 113 can be used to detect, for example, whether the electronic device 100 is coupled to a receiver of a shield of headwear, and whether the shield is in a first position relative to the headwear or in a second, angularly displaced position from the first position relative to the headwear. Generally speaking, the one or more sensor circuits 113 can include sensors configured to sense or determine physical parameters indicative of conditions in an environment about the electronic device 100.

Illustrating by example, the physical sensors can include devices for determining information such as motion, bearing, location, travel mode, acceleration, orientation, proximity to people, places, and other objects, lighting, capturing images, and so forth. The one or more sensor circuits 113 can include various combinations of microphones, location detectors, motion sensors, physical parameter sensors, temperature sensors, barometers, proximity sensor components, proximity detector components, wellness sensors, touch sensors, cameras, audio capture devices, and so forth. Many examples of sensor circuits 113 are described below with reference to FIG. 2. Others will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Turning now to FIG. 2, illustrated therein are examples of various sensor circuits 113 that can be operable—alone or in combination—with the one or more processors (104) of the electronic device (100) in accordance with one or more embodiments of the disclosure. It should be noted that the sensor circuits 113 shown in FIG. 2 are not comprehensive, as others will be obvious to those of ordinary skill in the art having the benefit of this disclosure. Additionally, it should be noted that the various sensor circuits 113 shown in FIG. 2 could be used alone or in combination. Accordingly, many electronic devices will employ only subsets of the sensor circuits 113 shown in FIG. 2, with the particular subset defined by device application.

An intelligent imager 201 can be configured to capture an image of environments about an electronic device and determine whether the object matches predetermined criteria. For example, the intelligent imager 201 operate as an identification module configured with optical recognition such as include image recognition, character recognition, visual recognition, facial recognition, color recognition, shape recognition and the like. Advantageously, the intelligent imager 201 can recognize whether a user's face or eyes are oriented toward the display (102) or another major surface of the electronic device (100), whether a user is gazing toward the display (102) or another major surface of the electronic device (100), or spatially where a user's eyes or face are located in three-dimensional space relative to the electronic device (100).

In addition to capturing photographs, the intelligent imager 201 can function in other ways as well. For example, in some embodiments the intelligent imager 201 can capture multiple successive pictures to capture more information that can be used to determine bearing and/or location. By referencing video or successive photographs with reference data, the intelligent imager 201 can determine, for example, whether a shield to which the electronic device (100) is coupled is in a first position or a second position that is radially displaced about headwear from the first position and the like. Alternatively, the intelligent imager 201 can capture images or video frames, with accompanying metadata such as motion vectors. This additional information captured by the intelligent imager 201 can be used to detect bearing and/or location of shields when coupled to the same.

In one embodiment, the sensor circuits 113 can include one or more proximity sensors. The proximity sensors can include one or more proximity sensor components 202. The proximity sensor components 202 can also include one or more proximity detector components 203. In one embodiment, the proximity sensor components 202 comprise only signal receivers. By contrast, the proximity detector components 203 include a signal receiver and a corresponding signal transmitter.

While each proximity detector component 203 can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components 203 comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components 202. The proximity detector components 203 can have signal receivers that receive similar wavelengths, i.e., about 860 nanometers.

In one or more embodiments the proximity sensor components 202 have a longer detection range than do the proximity detector components 203 due to the fact that the proximity sensor components 202 detect heat directly emanating from a person's body (as opposed to reflecting off the person's body) while the proximity detector components 203 rely upon reflections of infrared light emitted from the signal transmitter. For example, the proximity sensor component 202 may be able to detect a person's body heat from a distance of about ten feet, while the signal receiver of the proximity detector component 203 may only be able to detect reflected signals from the transmitter at a distance of about one to two feet.

In one embodiment, the proximity sensor components 202 comprise an infrared signal receiver so as to be able to detect infrared emissions from a person. Accordingly, the proximity sensor components 202 require no transmitter since objects disposed external to the housing (101) of the electronic device (100) deliver emissions that are received by the infrared receiver. As no transmitter is required, each proximity sensor component 202 can operate at a very low power level. Evaluations show that a group of infrared signal receivers can operate with a total current drain of just a few microamps (~10 microamps per sensor). By contrast, a proximity detector component 203, which includes a signal transmitter, may draw hundreds of microamps to a few milliamps.

In one embodiment, one or more proximity detector components 203 can each include a signal receiver and a corresponding signal transmitter. The signal transmitter can transmit a beam of infrared light that reflects from a nearby object and is received by a corresponding signal receiver. The proximity detector components 203 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

Another possible sensor circuit 113 is a near field communication circuit 204. The near field communication circuit 204 can be included for communication with other electronic devices, local area networks, and so forth to receive information relating to physical configurations of headwear to which the electronic device (100) may be coupled. Illustrating by example, the near field communication circuit 204 may poll other communication circuits embedded in headwear to determine the position of one or more shields of the headwear. Examples of suitable near field communication circuits include Bluetooth communication circuits, IEEE 801.11 communication circuits, infrared communication circuits, magnetic field modulation circuits, and Wi-Fi circuits.

The sensor circuits 113 can also include motion detectors, such as one or more accelerometers 205, and/or gyroscopes 206. For example, an accelerometer 205 may be used to show vertical orientation, constant tilt and/or whether the electronic device (100) is stationary. The measurement of tilt relative to gravity is referred to as "static acceleration," while the measurement of motion and/or vibration is referred to as "dynamic acceleration." A gyroscope 206 can be used in a similar fashion.

The motion detectors can also be used to determine the spatial orientation of the electronic device (100) as well in three-dimensional space by detecting a gravitational direction. This can determine, for example, whether the display (102) of the electronic device (100) is pointing downward to the earth or laterally to a user's eyes. In addition to, or instead of, an accelerometer 205 and/or gyroscope 206, an electronic compass can be included to detect the spatial orientation of the electronic device (100) relative to the earth's magnetic field. Similarly, the gyroscope 206 can be included to detect rotational motion of the electronic device (100).

A light sensor 207 can detect changes in optical intensity, color, light, or shadow in the environment of an electronic device (100). This can be used to make inferences about whether a first shield of headwear is in a first position or in a second, radially displaced position by determining whether ambient light is being received. For example, if the light sensor 207 detects low-light conditions due to the fact that the first shield, which may be opaque, is in a first position, the one or more processors (104) can cause the electronic device (100) to operate in a virtual reality mode of operation. Said differently, when the first shield is in the first position, in in one or more embodiments the light sensor 207 will detect an absence of ambient light. The one or more processors (104) may then cause the electronic device (100) to operate in the virtual reality mode of operation. An infrared sensor can be used in conjunction with, or in place of, the light sensor 207. The infrared sensor can be configured to detect thermal emissions from an environment about an electronic device, such as when sunlight is incident upon the electronic device.

A magnetometer 208 can be included as well. The magnetometer 208 can be configured to detect the presence of external magnetic fields. Illustrating by example, the magnetometer 208 can be used to determine whether a first shield is in a first position or a radially displaced second position by determining whether a magnet or metal material disposed along the second shield is adjacent to the first shield or not. As the first shield is moved relative to the second shield, the magnetometer 208 can be operable to detect different materials. This information can be used by the one or more processors (104) to determine whether to operate the electronic device (100) in a normal mode of operation, a virtual reality mode of operation, or an augmented reality mode of operation, as will be described in more detail below with reference to subsequent figures.

The sensor circuits 113 can also include an audio capture device 209, such as one or more microphones to receive acoustic input. The one or more microphones can be used to sense voice input, voice commands, and other audio input. The one or more microphones include a single microphone. In other embodiments, the one or more microphones can include two or more microphones. Where multiple microphones are included, they can be used for selective beam steering to, for instance, determine from which direction a sound emanated. Illustrating by example, a first microphone can be located on a first side of the electronic device (100) for receiving audio input from a first direction, while a second microphone can be placed on a second side of the electronic device (100) for receiving audio input from a second direction. The one or more processors (104) can then select between the first microphone and the second microphone to determine where the user is located in three-dimensional space relative to the electronic device (100).

It should be noted that the illustrative sensor circuits 113 of FIG. 2 are not comprehensive. Numerous others could be added. Accordingly, the sensor circuits 113 of FIG. 2 are illustrative only, as numerous others will be obvious to those of ordinary skill in the art having the benefit of this disclosure.

Figure 3:
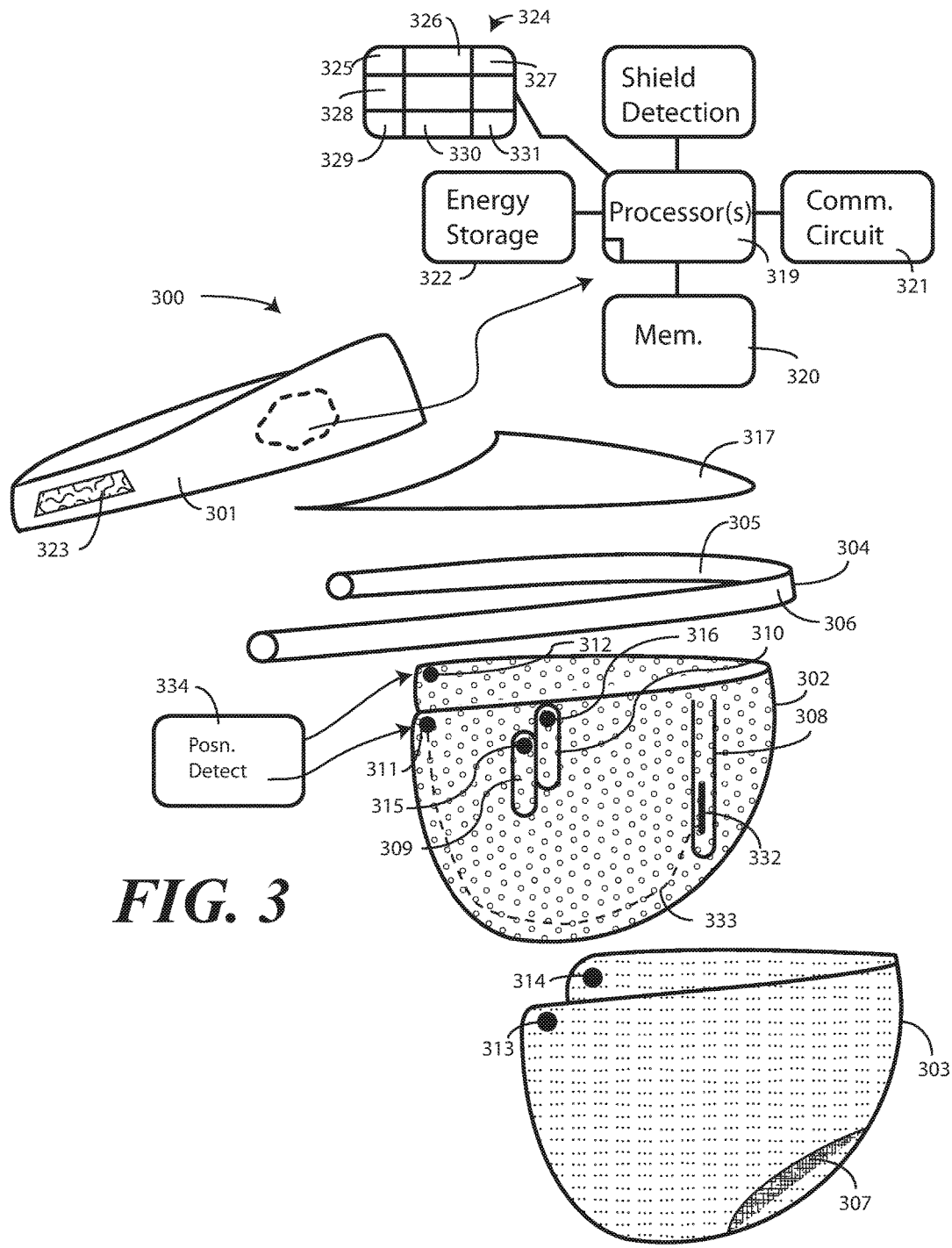
FIG. 3 illustrates a system view of one explanatory headwear configured in accordance with one or more embodiments of the disclosure.

Turning now to FIG. 3, illustrated therein is one explanatory apparatus 300 configured in accordance with one or more embodiments of the disclosure. The illustrative apparatus 300 of FIG. 3 is configured as headwear that can be worn by a user, and is shown in exploded view.

In this illustrative embodiment, the apparatus 300 includes a head receiver 301. The head receiver 301 is to receive a user's head. When the user desires to don the apparatus 300, they place their head into the head receiver 301. The head receiver 301 can be adjustable to accommodate different sizes of heads. While the head receiver 301 is shown illustratively as a headband, it can take other forms as well, including structural shapes such as a cap, hat, helmet, or other head-covering device.

The apparatus 300 also includes a first shield 302 and a second shield 303. In one embodiment, the first shield 302 is manufactured from an opaque material, such as an opaque thermoplastic material. In one embodiment, the second shield 303 is manufactured from a pellucid or translucent material so that ambient light can pass through. For instance, the second shield 303 can be manufactured from a clear thermoplastic material.

In one embodiment, the first shield 302 is pivotally coupled to the head receiver 301 so as to be movable between a first position relative to the head receiver 301 and a second position that is angularly displaced about the head receiver 301 relative to the first position. In one embodiment, the second shield 303 is also pivotally coupled to the head receiver 301 so as to be movable between a first position relative to the head receiver 301 and a second position that is angularly displaced about the head receiver 301 relative to the first position. In other embodiments, the second shield 303 is fixedly coupled to the head receiver 301 so as not to be movable.

In this illustrative embodiment, each of the first shield 302 and the second shield 303 is coupled to the head receiver 301 by way of a track 304. In subsequent embodiments, as will be described with reference to FIGS. 7-8 below, the first shield 302 and the second shield 303 can be coupled directly to the head receiver 301. Other configurations and coupling schemes will be obvious to those of ordinary skill in the art having the benefit of this disclosure.

In this illustrative embodiment, the first shield 302 is coupled to an interior 305 of the track 304, while the second shield 303 is coupled to an exterior 306 of the track 304. When transitioning between the first position and the second, angularly displaced position relative to the head receiver 301, in one embodiment the first shield 302 can travel along the interior 305 of the track 304 to ensure a consistent motion. Where the second shield 303 is movable relative to the head receiver 301, in one embodiment the second shield 303 can travel along the exterior 306 of the track 304. In other embodiments, the second shield 303 will be fixedly coupled to the exterior 306 of the track 304. In either scenario, the second shield 303 is coupled to the head receiver 301 exterior to the first shield 302. Thus, when the first shield 302 moves relative to the second shield 303, the exterior surface of the first shield 302 passes along an interior surface of the second shield 303. One or more mechanical features can be added to the interior 305 or exterior 306 of the track 304 to retain the first shield 302 and/or second shield 303 to the track 304 as desired.

In one or more embodiments, each of the first shield 302 and the second shield 303 is pivotally coupled to the track 304 by way of one or more couplers 311,312,313,314. For example, in one embodiment the two couplers 311,312 couple the first shield 302 to the interior 205 of the track 304, while two other couplers 313,314 couple the second shield 303 to the exterior 306 of the track 304.

The couplers 311,312,313,314 can be any of a number of different mechanisms that allow one or both of the first shield 302 or the second shield 303 to be flipped, rotated, detached, attached, or otherwise moved. For example, in one embodiment the couplers 311,312,313,314 comprise pin-and-barrel hinges. In another embodiment, the couplers 311,312,313,314 comprises hinge or pivoting devices. In one or more embodiments, the couplers 311,312,313,314 comprise torsion springs to bias one or both of the first shield 302 or the second shield 303 toward the first position or the angularly displaced second position. The torsion springs can also help to facilitate movement between the first position and the angularly displaced second position. Moreover, in some embodiments the torsion springs can preload one or both of the first shield 302 or the second shield 303 in the second, angularly displaced position. Other examples of couplers 311,312,313,314 will be obvious to those of ordinary skill in the art having the benefit of this disclosure.

In one embodiment, the second shield 303 comprises a holographic optical element 307. In one or more embodiments, the holographic optical element 307 is translucent such that ambient light can pass therethrough. The holographic optical element 307 can be any of a lens, filter, beam splitter, diffraction grating, or other device capable of reflecting light received along the interior of the second shield 303 to create holographic images. In one illustrative embodiment, the holographic optical element 307 comprises a pellucid holographic lens that is either integral to, or coupled to, the second shield 303. Other examples of holographic optical elements will be obvious to those of ordinary skill in the art having the benefit of this disclosure.

In one or more embodiments, the first shield 302 includes an electronic device receiver 308. Where the apparatus 300 is to be used with a portable electronic device (100), the electronic device receiver 308 is configured to receive the electronic device (100) and retain it in a securely coupled configuration with the first shield 302. As noted above, in other embodiments the components of the electronic device (100) can be integrated into the apparatus 300. Accordingly, in such embodiments, the electronic device receiver 308 can be replaced by a display and corresponding electronics, or alternatively a pair of displays, e.g., a left display and a right display. The display can optionally include a projector as previously described. Where a single display is used, it can of course present multiple images to the user at the same time (one for each eye). To provide a virtual reality experience, different information or content can be delivered to each of the user's eyes.

In one or more embodiments, the first shield 302 also includes one or more optical lenses 309,310. Since the electronic device (100), when positioned in the electronic device receiver 308, can be too close to the user's eyes for the user to properly focus upon the images, in one or more embodiments, the one or more optical lenses 309,310 can bend the light to make it easier for the user's eyes to see. Additionally, where multiple images are presented to the user at the same time, the one or more optical lenses 309,310 can help segregate this content so that the proper content reaches the proper eye without interference from content intended for the other eye. In one embodiment, the one or more optical lenses 309,310 comprise Fresnel lenses. In another embodiment, the one or more optical lenses 309,310 comprise hybrid Fresnel lenses. Other types of lenses will be obvious to those of ordinary skill in the art having the benefit of this disclosure.

In this illustrative embodiment, the optical lenses 309,310 are pivotally coupled to the first shield 302 so as to be pivotable between a first position relative to the first shield 302 and a second, angularly displaced position relative to the first shield 302. Embodiments of the disclosure contemplate that the user will need to look at the display (102) of the electronic device (100) through the one or more optical lenses 309,310 when the apparatus 300 is functioning as a virtual reality headset and the first shield 302 is in the first position. However, the one or more optical lenses 309,310 are not needed when the apparatus 300 is functioning as an augmented reality device. Additionally, the one or more optical lenses 309,310 can cause optical interference between the display (102) or projector (107) of the electronic device (100) and the holographic optical element 307 off which images reflect to provide augmented reality imagery to the user. Advantageously, the inclusion of one or more couplers 315,316 to pivotally couple the one or more optical lenses 309,310 to the first shield 302 allows them to pivot, when the first shield 302 is in the second, angularly displaced position relative to the head receiver 301, so as to define an unobstructed optical line of sight between the electronic device receiver and the holographic optical element. This will be illustrated in more detail below with reference to FIG. 5.

In one or more embodiments, an optional visor 317 can be coupled to the track 304 or the first shield 302 to prevent ambient light from passing to the eyes of a user. Where the visor 317 is included, it works to ensure that the minimum quantity of exterior light reaches the user's eyes when the apparatus 300 is operating as a virtual reality headset. The visor 317 can also work to improve the user experience by reducing noise introduced by ambient light interfering with the images presented by the display (102) of the electronic device (100). Moreover, the display (102) can operate at a lower brightness, thereby conserving power when the visor 317 is in place. The visor 317 can optionally be detachable such that it is only attached to the first shield 302 when the apparatus 300 is operating as a virtual reality headset.

The apparatus 300 can optionally include integrated electronics 318 as well. For example, in one or more embodiments, the apparatus 300 is configured as an electronic device. Accordingly, the head receiver 301 or another part of the apparatus can comprise one or more electrical components. Some of these electrical components are shown illustratively in FIG. 3. It will be clear to those of ordinary skill in the art having the benefit of this disclosure that the electrical components and associated modules can be used in different combinations, with some components and modules included and others omitted. Components or modules can be included or excluded based upon need or application.

The electronic components can include one or more processors 319. The one or more processors 319 can be operable with a memory 320. The one or more processors 319, which may be any of one or more microprocessors, programmable logic, application specific integrated circuit device, or other similar device, are capable of executing program instructions and methods. The program instructions and methods may be stored either on-board in the one or more processors 319, or in the memory 320, or in other computer readable media coupled to the one or more processors 319.

In one or more embodiments, the apparatus 300 also includes an optional wireless communication device 321. Where included, the wireless communication device 321 is operable with the one or more processors 319, and is used to facilitate electronic communication with one or more electronic devices or servers or other communication devices across a network. Note that it is possible to combine the one or more processors 319, the memory 320, and the wireless communication device 321 into a single device, or alternatively into devices having fewer parts while retaining the functionality of the constituent parts.

A battery 322 or other energy storage device can be included to provide power for the various components of the apparatus 300. While a battery 322 is shown in FIG. 2, it will be obvious to those of ordinary skill in the art having the benefit of this disclosure that other energy storage devices can be used instead of the battery 322, including a micro fuel cell or an electrochemical capacitor. The battery 322 can include a lithium ion cell or a nickel metal hydride cell, such cells having sufficient energy capacity, wide operating temperature range, large number of charging cycles, and long useful life. The battery 322 may also include overvoltage and overcurrent protection and charging circuitry. In one embodiment, the battery 322 comprises a small, lithium polymer cell.

In one or more embodiments, a photovoltaic device 323, such as a solar cell, can be included to recharge the battery 322. In one embodiment, the photovoltaic device 323 can be disposed along the head receiver 301, or optionally on the visor 317.

Other components 324 can be optionally included in the apparatus 300 as well. For example, in one embodiment one or more microphones can be included as audio capture devices 325. These audio capture devices can be operable with the one or more processors 319 to receive voice input. Additionally, in one or more embodiments the audio capture device 325 can capture ambient audio noise and cancel it out. In one or more embodiments, the audio capture device 325 can record audio to the memory 320 for transmission through the wireless communication device 321 to a server complex across a network.

The other components 324 can also include a motion generation device 326 for providing haptic notifications or vibration notifications to a user. For example, a piezoelectric transducer, rotational motor, or other electromechanical device can be configured to impart a force or vibration upon the head receiver 301. The motion generation device 326 can provide a thump, bump, vibration, or other physical sensation to the user. The one or more processors 319 can be configured to actuate the motion generation device 326 to deliver a tactile or vibration output alone or in combination with other outputs such as audible outputs.

Similarly, in one or more embodiments the eyewear can include a video capture device 327 such as an imager. In one or more embodiments, the video capture device 327 can function as a to detect changes in optical intensity, color, light, or shadow in the near vicinity of the apparatus 300. Other optional components include a global positioning system device 328 for determining where the apparatus 300 is located. The global positioning system device 328 can communicate with a constellation of earth orbiting satellites or a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. While a global positioning system device 328 is one example of a location determination module, it will be clear to those of ordinary skill in the art having the benefit of this disclosure that other location determination devices, such as electronic compasses or gyroscopes, could be used as well.

An optional user interface 329 can be included. The user interface 329 can be used, for example, to activate the circuit components or turn them OFF and so forth. The user interface 329, where included, can be operable with the one or more processors 319 to deliver information to, and receive information from, a user. The user interface 329 can include a rocker switches, slider pad, button, touch-sensitive surface, or other controls, and optionally a voice command interface. These various components can be integrated together.

In one or more embodiments, an audio output device 230, such as a loudspeaker or other transducer, can deliver audio output to a user. For example, piezoelectric transducers can be operably disposed within the head receiver. Actuation of the piezoelectric transducers can cause the same to vibrate, thereby emitting acoustic output. More traditional audio output devices 230, such as loudspeakers, can be used as well.

A haptic device 331 can be included for providing haptic feedback to a user. The haptic device 331 can include a motion generation device to deliver a tactile response to the user. For example, a piezoelectric transducer or other electromechanical device can be included in the head receiver 301. The transducer can actuate to impart a force upon the user's head to provide a thump, bump, vibration, or other physical sensation to the user. The inclusion of both the audio output device 330 and the haptic device 331 allows both audible and tactile feedback to be delivered to the user to enhance either a virtual reality experience or an augmented reality experience.

The apparatus 300 of FIG. 3 can operate as a stand-alone electronic device in one or more embodiments, such as when it includes a display and other corresponding electronic components as noted above. However, in other embodiments, the apparatus 300 can operate in tandem with a portable electronic device, such as the electronic device (100) from FIG. 1, to form a combined headwear/eyewear system.

In one or more embodiments, the electronic device receiver 308 is electrically coupled to one or more of the integrated electronics 318. For example, in one embodment the electronic device receiver 308 includes a connector 332 that is coupled by an electrical connector 333 to one or more of the integrated electronics 318. In the illustrative embodiment of FIG. 3, the connector 332 is electrically coupled to one or more positional detectors 334 operable with the couplers 311,312 of the first shield 302 to determine whether the first shield 302 is in the first position or the second, angularly displaced position. In one embodiment, the couplers 311,312 comprise the positional detectors 334. Where such positional detectors 334 are included, the electrical connector 333 can be coupled directly to the positional detectors 334, or optionally to the one or more processors 319, to receive an electronic signal 335 indicating whether the first shield 302 is in the first position, the second, angularly displaced position, or somewhere in between.

Figure 4:
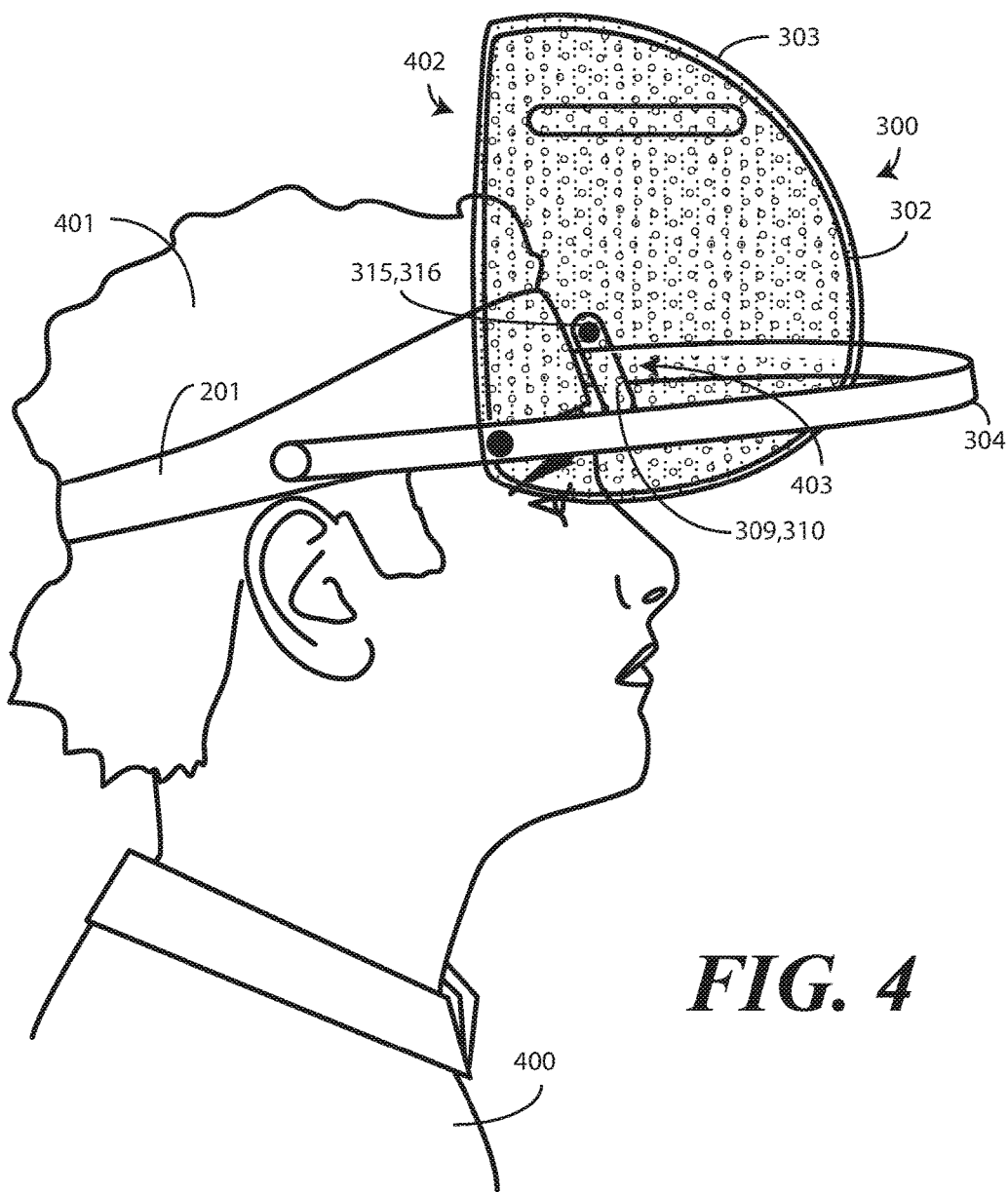
FIG. 4 illustrates a user wearing an explanatory headwear in accordance with one or more embodiments of the disclosure.

Now that the various hardware components have been described, attention will be turned to methods, systems, and use cases in accordance with one or more embodiments of the disclosure. Turning now to FIG. 4, a user 400 is shown wearing the apparatus 300 of FIG. 3. The user 400 has inserted his head 401 into the head receiver 301.

In this illustrative embodiment, both the first shield 302 and the second shield 303 are pivotable relative to the track 304. As shown in FIG. 4, each of the first shield 302 and the second shield 303 have been rotated to a second, angularly displaced position 402 relative to the head receiver 301. Advantageously, the user 400 can see the world around themself without optical interference from either the first shield 302 or the second shield 303.

As shown in FIG. 4, in one embodiment when the first shield 302 is pivoted about the track 304 to the second, angularly displaced position, the one or more optical lenses 309,310 pivot to a second orientation 403 about their couplers 315,316. In this illustrative embodiment, the one or more optical lenses 309,310 are pulled downward by the action of gravity about the couplers 315,316.

Figure 5:
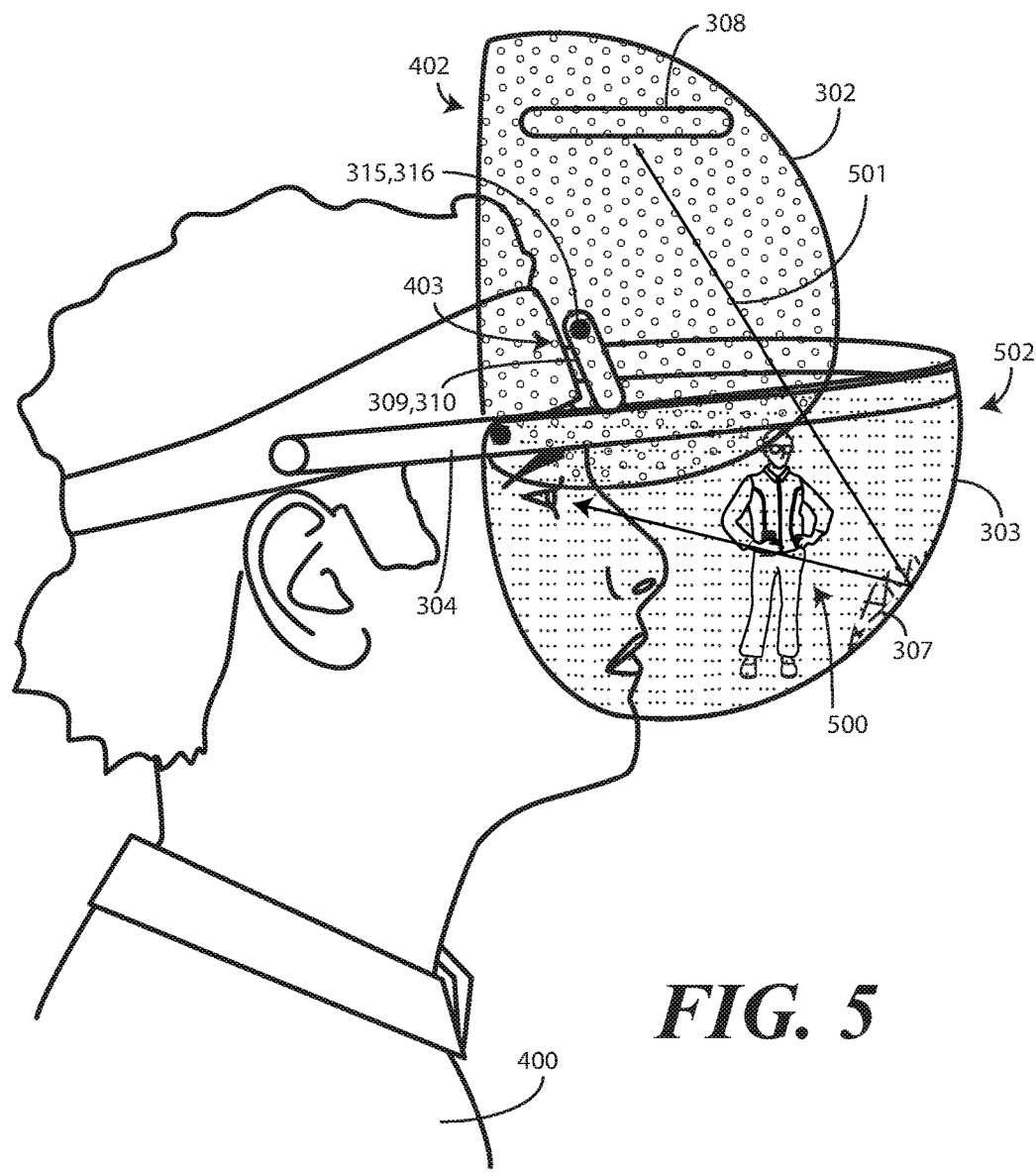
FIG. 5 illustrates an explanatory headwear configured in accordance with one or more embodiments of the disclosure operating in an augmented reality mode of operation.

Turning now to FIG. 5, the second shield 303 has been pivoted about the track 304 from the second, angularly displaced position 402 to a first position 502. The first shield 302 is still in the second, angularly displaced position 402. The one or more optical lenses 309,310 remain pivoted to the second orientation 403 about their couplers 315,316. This defines an unobstructed optical line of sight 501 between the electronic device receiver 308 and the holographic optical element 307 of the second shield 303. Accordingly, either the display (102) or projector (107) of an electronic device (100), or alternatively an integrated display or imager, can reflect light off the holographic optical element 307 to provide an augmented reality experience 500 to the user 400. Since the second shield 303 is pellucid or translucent in one or more embodiments, the augmented reality experience 500 allows the user 400 to see images superimposed on the view of their environment.

Figure 6:
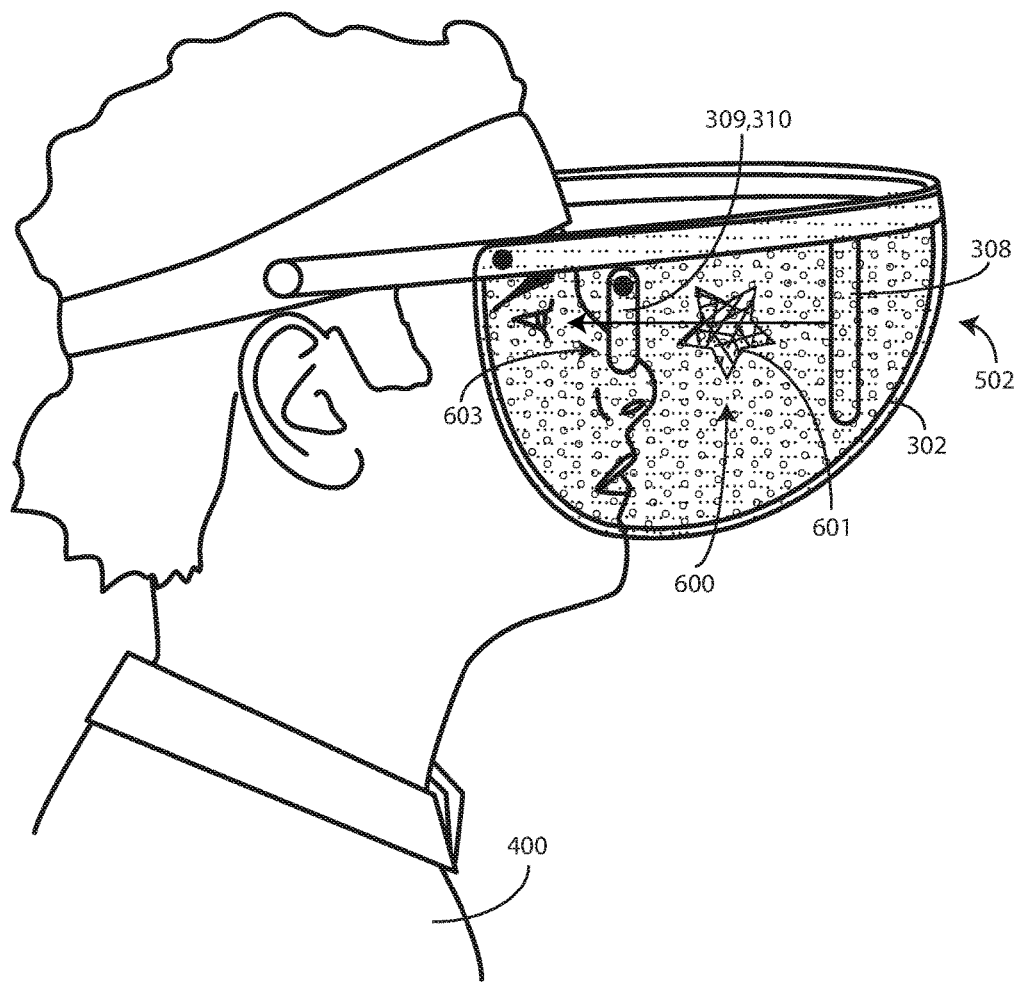
FIG. 6 illustrates an explanatory headwear configured in accordance with one or more embodiments of the disclosure operating in a virtual reality mode of operation.

Turning now to FIG. 6, the first shield 302 has been pivoted from the second, angularly displaced position (402) to the first position 502. The one or more optical lenses 309,310, due to the operation of gravity in this embodiment (a motor or other mechanism could also be used) pivot from the second orientation (403) to a first orientation 603. In the first orientation 603, the optical line of sight 601 between the electronic device receiver 308 and the user 400 passed through the one or more optical lenses 309,310. Accordingly, either the display (102) or projector (107) of an electronic device (100), or alternatively an integrated display or imager, can deliver light through the one or more optical lenses 309,310 to provide a virtual reality experience 600 to the user 400. Since the first shield 302 is opaque in one or more embodiments, the user 400 experiences the virtual reality experience 600 without the interference of ambient light. A visor (317) can be added to further block ambient light in one or more embodiments.

Figure 7:
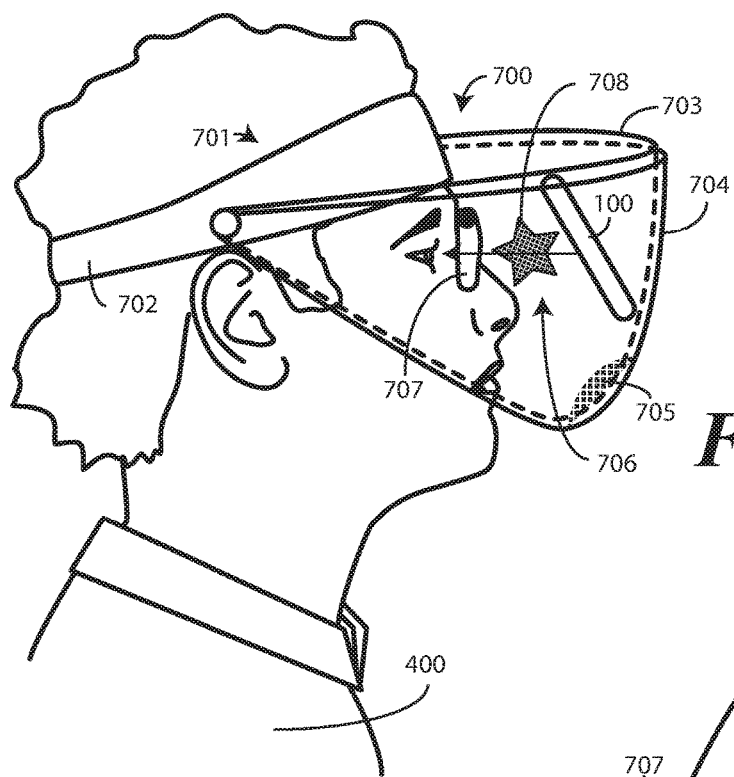
FIG. 7 illustrates an alternate headwear configured in accordance with one or more embodiments of the disclosure operating in a virtual reality mode of operation.

Turning now to FIG. 7, illustrated therein is a user 400 wearing an alternate apparatus 700 configured in accordance with one or more embodiments of the disclosure. In this embodiment, the apparatus comprises headwear 701 comprising a head receiver 702. A first shield 703 and a second shield 704 are pivotally coupled to the head receiver 702. In this embodiment, the second shield 704 is coupled exterior to the first shield 703 relative to the face of the user 400. As before, the second shield 704 comprises a holographic optical element 705.

An electronic device 100 is mechanically coupled to the first shield 703 by way of an electronic device receiver. In one embodiment, the electronic device 100 comprises one or more processors (104) operable to determine whether the first shield 703 is in a first position relative to the head receiver 702, as shown in FIG. 7, or is in a second, angularly displaced position, as shown in FIG. 8.

In FIG. 7, the first shield 703 is in the first position. Where this is the case, the one or more processors (104) operate the electronic device 100 in a virtual realty mode of operation 706. Here, in the virtual reality mode of operation 706, the display (102) or projector (107) of the electronic device 100 delivers light through the one or more optical lenses 707 to provide virtual reality images 708 to the user 400. In this illustrative embodiment, thereto, the one or more processors (104) operate the electronic device 100 in the virtual reality mode of operation 706 by delivering one or more virtual reality images 708 to the one or more optical lenses 707. Since the first shield 703 is opaque in one or more embodiments, the user 400 experiences the virtual reality images 708, shown as floating stars for illustration, without the interference of ambient light. A visor (not shown) can be added to further block ambient light in one or more embodiments.

Figure 8:
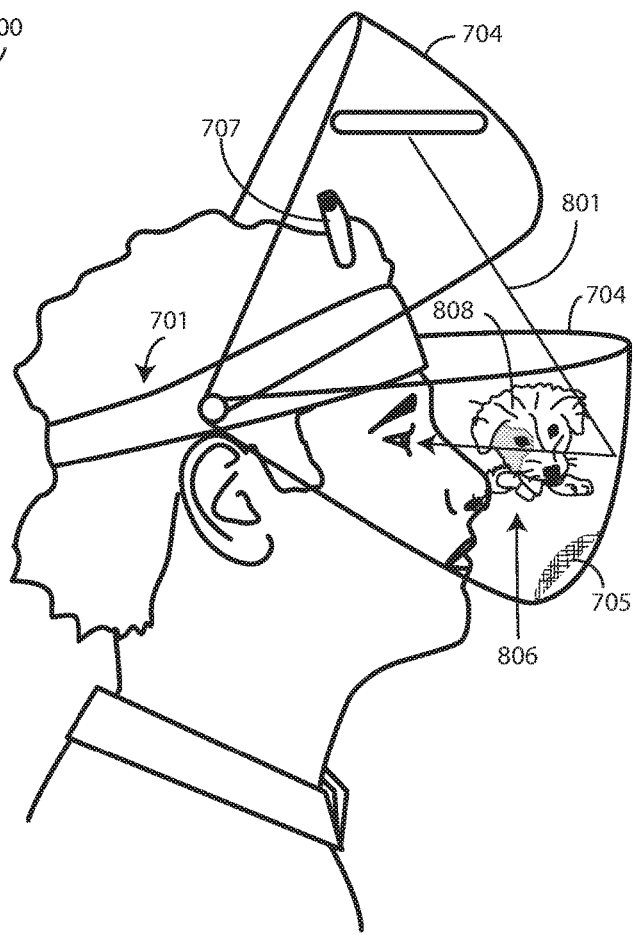
FIG. 8 illustrates an alternate headwear configured in accordance with one or more embodiments of the disclosure operating in an augmented reality mode of operation.

By contrast, turning now to FIG. 8, the first shield 703 has been pivoted about the headwear 701 to the second, angularly displaced position. In one embodiment, when this occurs, one or more optical lenses 707, pivotally coupled to the first shield 703, pivot from a first orientation relative to the first shield 703, shown in FIG. 7, to a second orientation relative to the first shield 703, shown in FIG. 8. This defines an unobstructed optical line of sight 801 between one or more of the electronic device 100, the display (102) of the electronic device 100, and/or the projector (107) of the electronic device 100 and the holographic optical element 705 of the second shield 704. Where the first shield 703 is in the second, angularly displaced position, in one or more embodiments the one or more processors (104) operate the electronic device 100 in an augmented reality mode of operation 806. For example, where the electronic device 100 includes a projector (107), the one or more processors (104) can operate the electronic device 100 in the augmented reality mode of operation 806 by delivering one or more images 808, here pictures of the user's dog, Buster, to the holographic optical element 705 of the second shield 704 for reflection to the user's eyes.

Figure 9:
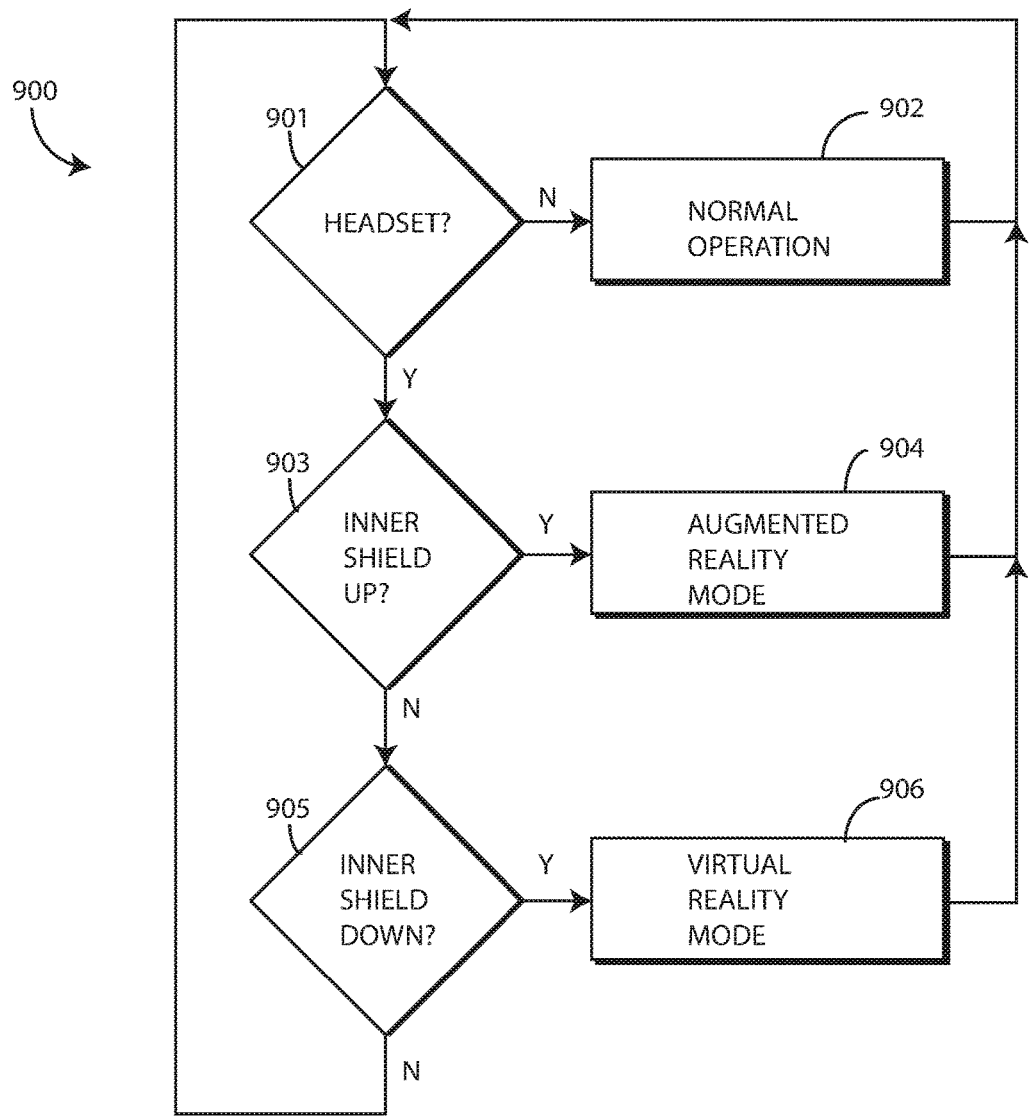
FIG. 9 illustrates one explanatory method in accordance with one or more embodiments of the disclosure.

Turning now to FIG. 9, illustrated therein is one explanatory method 900 in accordance with one or more embodiments of the disclosure. At decision 901, the method 900, with one or more processors of an electronic device, whether the electronic device is coupled to a first shield of headwear comprising a head receiver. Where it is not, the one or more processors operate the electronic device normally at step 902.

Where the electronic device is coupled to a first shield of headwear comprising a head receiver, at decision 903 the one or more processors determine whether the first shield of the headwear is in a second, angularly displaced position relative to the head receiver. Where it is, at step 904 the one or more processors operate the electronic device in an augmented reality mode of operation.

At decision 905 the one or more processors determine whether the first shield of the headwear is in a first position relative to the head receiver. Where it is, at step 906 the one or more processors operate the electronic device in an augmented reality mode of operation. In one embodiment, step 906 comprises projecting, with a projector of the electronic device, one or more images to a holographic optical element of a second shield of the headwear.

Figure 10:
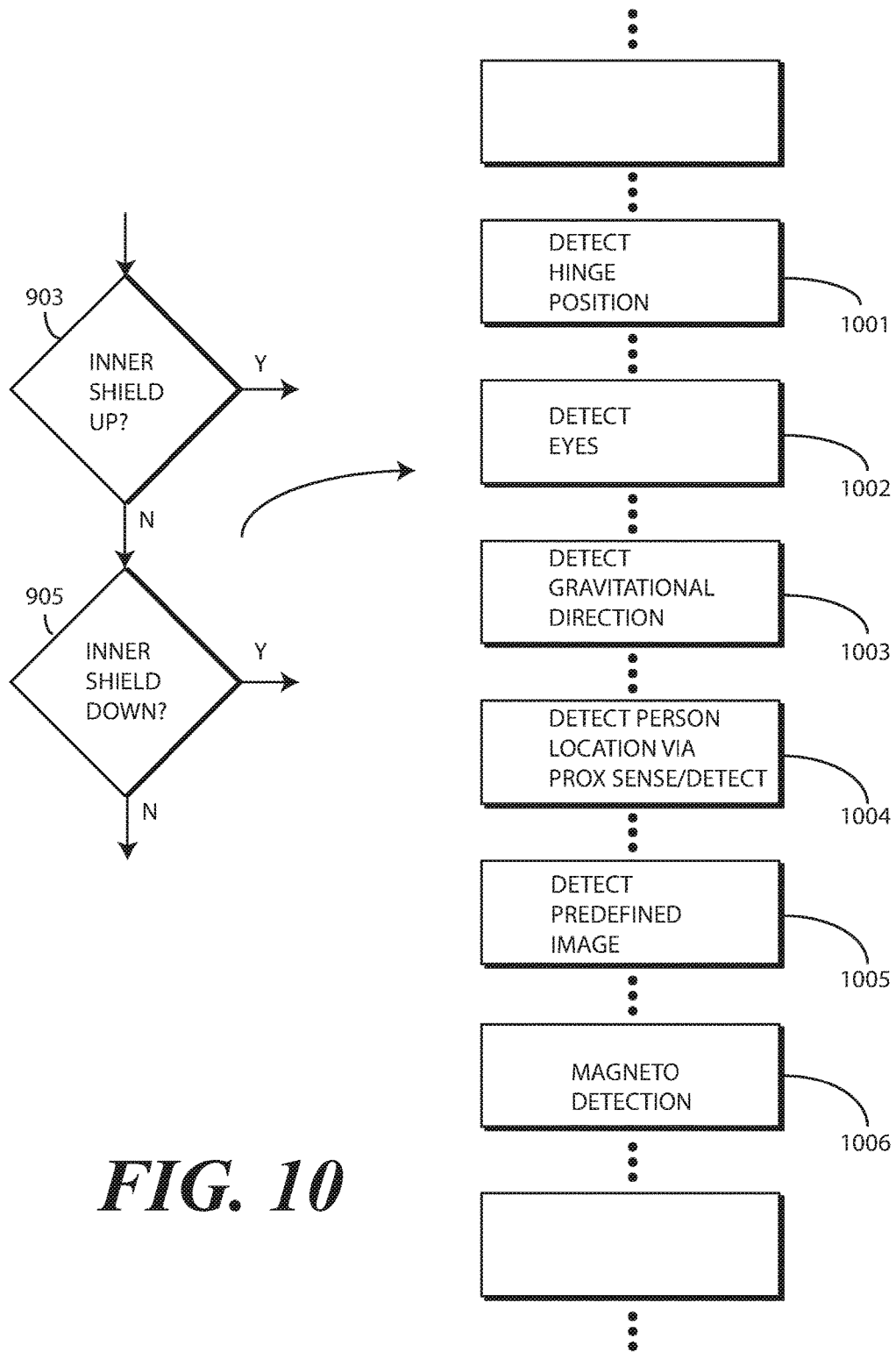
FIG. 10 illustrates another explanatory method in accordance with one or more embodiments of the disclosure.

Decision 903 and decision 905 can be made in various ways as a function of various inputs. Turning now to FIG. 10, some examples of these techniques and those inputs are shown. These are examples only. Other techniques and other inputs will be obvious to those of ordinary skill in the art having the benefit of this disclosure.

Beginning with step 1001, in one embodiment the headwear comprises positional detectors to determine whether the first shield is in the first position or the second, angularly displaced position. Accordingly, in one embodiment, decision 903 and decision 905 comprise receiving, at step 1001, from a positional detector of the headwear, a signal indicating whether the first shield is in the first position or the second, angularly displaced position.

At step 1002, in one embodiment the electronic device comprises an intelligent imager. Accordingly, in one embodiment, decision 903 and decision 905 comprise, at step 1002, using the intelligent imager to determine whether the first shield is in a first position relative to the head receiver or a second, angularly displaced position by capturing images of a user's eyes with the intelligent imager.

Alternatively, as shown at step 1005, an image captured by the intelligent imager can be compared to a reference image to determine, for example, whether the user's face appears in the image. If, for example, the user's face fails to appear in the image, this can mean that the display is facing downward and that the first shield is in the second, angularly displaced position. By contrast, where the user's face appears in the image, this can mean the display is facing laterally and the shield is in the first position.

At step 1003, in one embodiment the electronic device comprises a gravity detector. For example, as one or more accelerometers and/or gyroscopes may be used to show vertical orientation, constant, or a measurement of tilt relative to gravity. Accordingly, in one embodiment, decision 903 and decision 905 comprise, at step 1003, using the gravity detector to determine whether the first shield is in a first position relative to the head receiver or a second, angularly displaced position by detecting a gravitational direction. If, for example, the direction of gravity is through a major face of the electronic device, such as the display, this can mean that the display is facing downward and that the first shield is in the second, angularly displaced position. By contrast, where the direction of gravity runs through a minor face of the electronic device, e.g., a side of the electronic device, this can mean the display is facing laterally and the shield is in the first position.

At step 1004, in one embodiment the electronic device comprises one or more proximity sensors. Accordingly, in one embodiment, decision 903 and decision 905 comprise, at step 1004, determining whether the first shield is in a first position relative to the head receiver or a second, angularly displaced position by determining whether an object is proximately located with the display. If an object such as the user's face is closer to the display, as determined by the proximity sensors, the first shield is likely in the first position. By contrast, if the object is farther from the display, as determined by the proximity sensors, the first shield is likely in the second, angularly displaced position.

At step 1006, in one embodiment the electronic device comprises a magnetometer. In one embodiment, the second shield includes a magnet or magnetic material. Accordingly, in one embodiment, decision 903 and decision 905 comprise, at step 1006, determining whether the first shield is in a first position relative to the head receiver or a second, angularly displaced position by determining whether the magnetometer detects a stronger or weaker magnetic field. If a stronger magnetic field is detected, as determined by the magnetometer, the first shield is likely in the first position. By contrast, if a weaker or no magnetic field is detected, as determined by the magnetometer, the first shield is likely in the second, angularly displaced position.

The various techniques and inputs of FIG. 10 can be used in a variety of ways. Illustrating by example, in one embodiment, the electronic device is inserted into an electronic device receiver of the first shield. The electronic device receiver has an electronic connector, which in one embodiment is a Universal Serial Bus (USB) 3 connector. Alternatively, the electronic connector can be a USB-C connector or other interface. In still other embodiments, the electronic connector can be a USB-SS connector, a Serial Peripheral Interface (SPI) connector, a Display Serial Interface (DSI) connector, a Camera Serial Interface (CSI) connector, a Mobile Industry Processor Interface (MIPI) connector, or other type of connector. Still other connectors will be obvious to those of ordinary skill in the art. Working in conjunction with positional detectors disposed within the headwear, electronic signals can be received through the electrical connector to inform the device whether the first shield is in the first position or the second, angularly displaced position.

Alternatively, using an intelligent imager, the electronic device can determine if the user's eyes are detected. If the users eyes are detected, the one or more processors operate in a virtual reality mode of operation. By contrast, where the eyes are not detected, the one or more processors can operate in an augmented reality mode of operation.

Alternatively, since an intelligent imager may consume relatively high amounts of current, one or more proximity sensors can be used in conjunction with the intelligent imager to conserve power. Specifically, the one or more proximity sensors can detect the positioning of the electronic device in the headwear before actuating the intelligent imager to confirm the same information. When the first shield is in the second, angularly displaced position, the one or more proximity sensors will not detect a close presence of the user. The intelligent imager can confirm this first shield position by confirming that the user's eyes are not detected.

By contrast, when the first shield is in the first position, the one or more proximity detectors will detect a close presence of the user. The intelligent imager can confirm this first shield position by capturing images of the user's eyes.

In still another embodiment, the intelligent imager can employ a reference picture or icon such that when the first shield is in the second, angularly displaced position the reference picture or icon will not be detected. However, when the first shield is in the first position, the intelligent imager will detect the reference picture or icon.

In still another embodiment, an accelerometer, gravity detector, or gyroscope can determine the position of the first shield. The one or more processors can monitor the accelerometer to detect, for example, a gravitational direction.

Each first shield position would have associated therewith reference accelerometer sensor data. This could be referenced to determine whether the first shield is in the first position or the second, angularly displaced position. The examples above are illustrative only, as numerous others will be obvious to those of ordinary skill in the art having the benefit of this disclosure.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An apparatus, comprising:
a head receiver;
a first shield, pivotally coupled to the head receiver and movable between a first position relative to the head receiver and a second, angularly displaced position relative to the head receiver, the first shield comprising:
an electronic device receiver; and
one or more optical lenses pivotally coupled to the first shield; and
a second shield, coupled to the head receiver exterior to the first shield, the second shield comprising a holographic optical element.

2. The apparatus of claim 1, the first shield manufactured from an opaque material.

3. The apparatus of claim 2, the second shield manufactured from a pellucid material.

4. The apparatus of claim 2, the holographic optical element comprising a pellucid holographic lens.

5. The apparatus of claim 1, the apparatus further comprising a positional detector and one or more processors detecting, with the positional detector, whether the first shield is in the first position or the second, angularly displaced position.

6. The apparatus of claim 5, the electronic device receiver further comprising a connector electrically coupled to the one or more processors, the one or more processors delivering a signal to the connector indicating whether the first shield is in the first position or the second, angularly displaced position.

7. The apparatus of claim 5, further comprising one or more couplers pivotally coupling the first shield to the head receiver, wherein the one or more couplers comprise the positional detector.

8. The apparatus of claim 1, wherein the one or more optical lenses pivot from a first orientation to a second orientation when the first shield pivots from the first position to the second, angularly displaced position to define an unobstructed optical line of sight between the electronic device receiver and the holographic optical element.

9. An apparatus, comprising:
headwear comprising a head receiver comprising a first shield pivotally coupled to the head receiver and a second shield coupled to the head receiver exterior to the first shield, wherein the second shield comprises a holographic optical element; and
an electronic device mechanically coupled to the first shield, the electronic device comprising one or more processors:
determining whether the first shield is in a first position relative to the head receiver or a second, angularly displaced position; and
where the first shield is in the first position, operating the electronic device in a virtual reality mode of operation; and
where the first shield is in the second, angularly displaced position, operating the electronic device in an augmented reality mode of operation.

10. The apparatus of claim 9, the electronic device comprising a projector, wherein the one or more processors operate the electronic device in the augmented reality mode of operation by delivering one or more images to the holographic element.

11. The apparatus of claim 10, the first shield comprising one or more optical lenses pivotally coupled thereto, the one or more optical lenses pivoting from a first orientation relative to the first shield to a second orientation relative to the first shield when the first shield pivots from the first position to the second, angularly displaced position to define an unobstructed optical line of sight between the projector and the holographic optical element.

12. The apparatus of claim 9, the first shield comprising one or more optical lenses pivotally coupled thereto, wherein the one or more processors operate the electronic device in the virtual reality mode of operation by delivering one or more images to the one or more optical lenses.

13. The apparatus of claim 9, the electronic device comprising a gravity detector, the one or more processors determining whether the first shield is in a first position relative to the head receiver or a second, angularly displaced position by detecting a gravitational direction.

14. The apparatus of claim 9, the electronic device comprising an intelligent imager, the one or more processors determining whether the first shield is in a first position relative to the head receiver or a second, angularly displaced position by capturing images of a user's eyes with the intelligent imager.

15. The apparatus of claim 9, the electronic device comprising a display one or more proximity sensors, the one or more processors determining whether the first shield is in a first position relative to the head receiver or a second, angularly displaced position by determining whether an object is proximately located with the display.

16. The apparatus of claim 9, the headwear further comprising a positional detector, the one or more processors determining whether the first shield is in a first position relative to the head receiver or a second, angularly displaced position by receiving, through a connector coupled to the first shield, a signal indicating whether the first shield is in the first position or the second, angularly displaced position.

17. A method, comprising:
determining, with one or more processors of an electronic device, whether the electronic device is coupled to a first shield of headwear comprising a head receiver;
detecting, with the one or more processors, whether the first shield of the headwear is in a first position relative to the head receiver or in a second, angularly displaced position relative to the head receiver; and where the first shield is in the first position, operating, with the one or more processors, the electronic device in a virtual reality mode of operation; and where the first shield is in the second, angularly displaced position, operating, with the one or more processors, the electronic device in an augmented reality mode of operation.

18. The method of claim 17, wherein operating the electronic device in the augmented reality mode of operation comprises projecting, with a projector of the electronic device, one or more images to a holographic optical element of a second shield of the headwear.

19. The method of claim 17, the detecting comprising receiving, from a positional detector of the headwear, a signal indicating whether the first shield is in the first position or the second, angularly displaced position.

20. The method of claim 17, the detecting comprising determining, with a gravity detector, a direction of gravity.

* * * * *